(No Model.) 2 Sheets—Sheet 1.

H. A. BECKER.
VELOCIPEDE.

No. 439,095. Patented Oct. 28, 1890.

Witnesses:
E. L. Richards
E. B. Bolton

Inventor:
Hugo Auguste Becker
By Richards
his Attorney.

(No Model.) 2 Sheets—Sheet 2.

H. A. BECKER.
VELOCIPEDE.

No. 439,095. Patented Oct. 28, 1890.

Witnesses
E. L. Richards
E. B. Bolton

Inventor:
Hugo Auguste Becker
By Richards & Co
his Attorney

UNITED STATES PATENT OFFICE.

HUGO AUGUSTE BECKER, OF BLAENARVON, ENGLAND.

VELOCIPEDE.

SPECIFICATION forming part of Letters Patent No. 439,095, dated October 28, 1890.

Application filed October 19, 1889. Serial No. 327,488. (No model.)

*To all whom it may concern:*

Be it known that I, HUGO AUGUSTE BECKER, residing at Godwith Cottage, Blaenarvon, in the county of Monmouth, in the principality of Wales, in the United Kingdom of Great Britain and Ireland, have invented certain new and useful Improvements in Anti-Vibrating Cycles or Velocipedes, (for which I have applied for provisional protection in Great Britain, dated May 6, 1889, No. 7,544,) of which the following is a full, clear, and exact description.

This invention has for its object the lessening or overcoming of vibrations in cycles or velocipedes of all kinds, and it is also applicable to other vehicles mounted on metal wheels, such as chairs for invalids and the like.

It consists of a vertical spring-frame interposed between the body or seat of the cycle or vehicle, and the wheel or wheels, and in the case of bicycles is intended to be chiefly used on the back wheel, which carries the greater part of the rider's weight, although it is applicable to the front wheel also, in a more or less modified form, as hereinafter explained.

I will now proceed to describe my invention, as shown in the accompanying drawings, in which—

Figure 1:
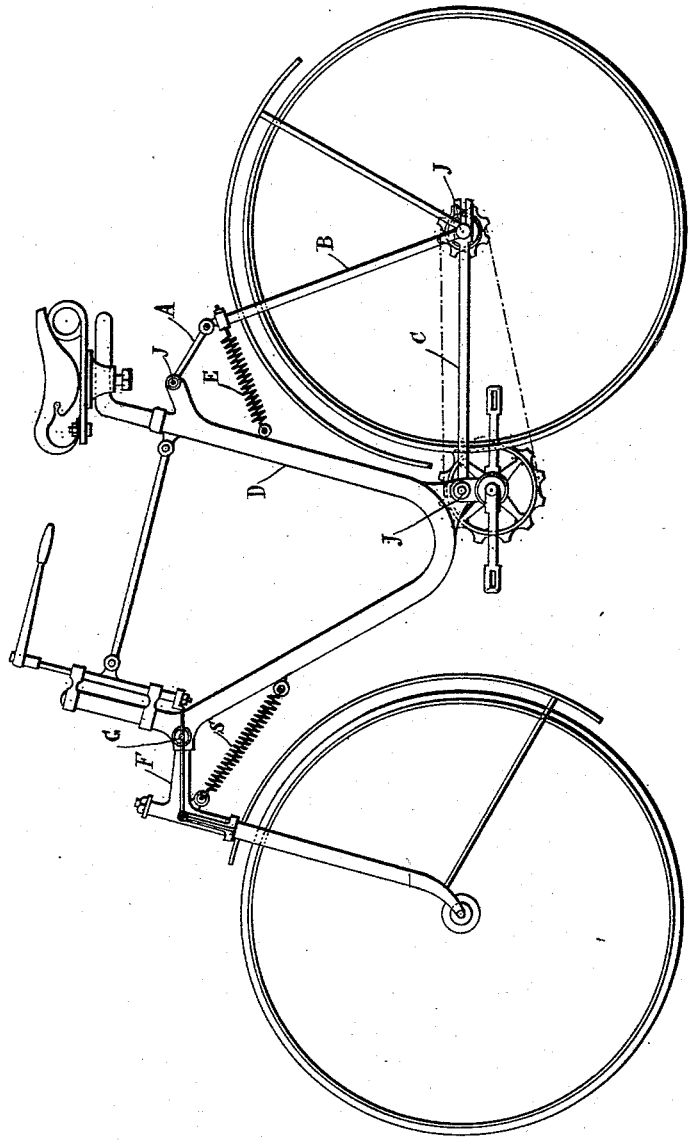

Figure 1, Sheet I, shows a Safety bicycle with an ordinary V-body, one part of which, namely, the vertical seat-support, is utilized as one side of my spring-frame, which forms altogether a quadrilateral or four-sided figure composed of four angular, curved, or straight connecting-rods of varying length, which are hinged or pivoted together at or near the points of contact. These four rods are lettered, respectively, A B C D, and their points of contact or joints are denoted by the letter J. It will be seen that the joints are rigid in a lateral or horizontal direction, but work easily in the vertical direction, thus yielding readily to any pressure or blow caused by the wheel encountering an obstacle on the road. In this vertical motion the joints are controlled by the tension-spring E, which may be made in any of the well-known forms of springs suitable for such a purpose. The front wheel of the bicycle is shown attached to the body by the bar or tube F, the connection taking place at the joint G, as at the other wheel, and being controlled by the spring S.

Figure 2:
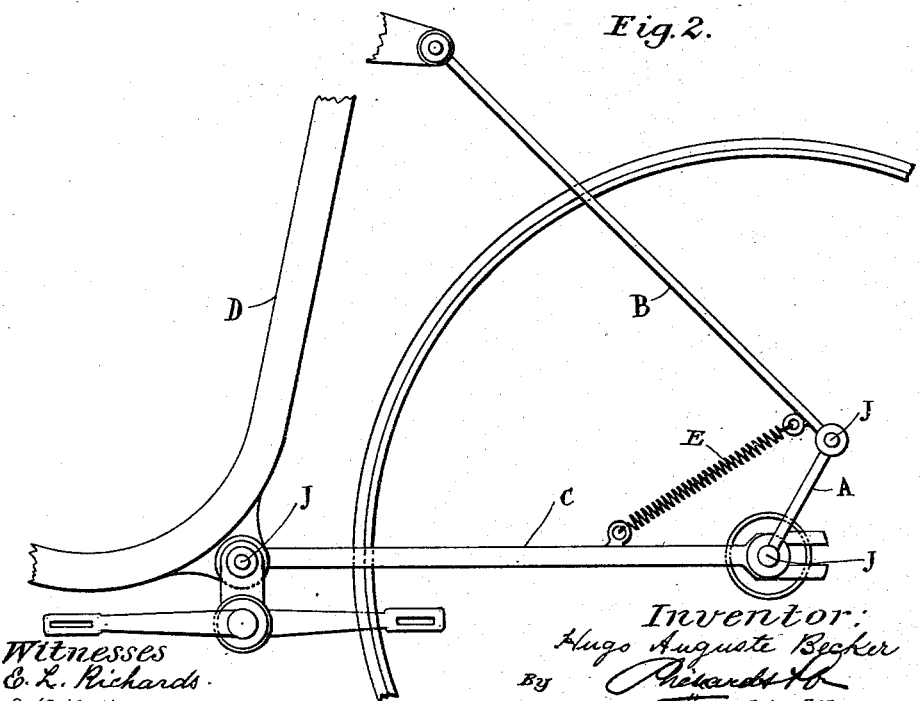

Fig. 2, Sheet II, shows another mode of arranging my quadrilateral frame, which can be varied in many ways to suit the shape of the cycle-body without departing from the principle. In this case the short connecting-rod A is placed near the axle of the wheel and below B instead of above it as in Fig. 1. The spring E is also differently placed; but the action of the whole frame is precisely similar in both cases.

Figure 3:
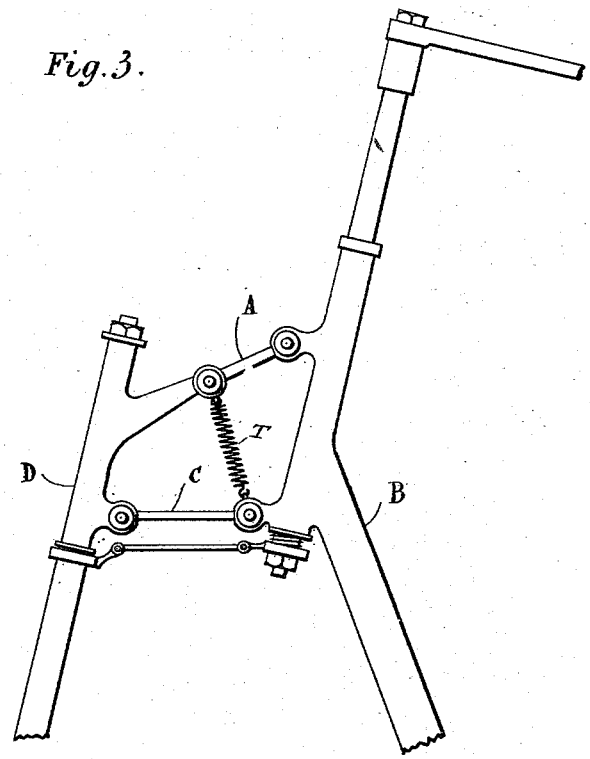

Fig. 3, Sheet II, shows the front of a Safety bicycle-body with a modification of my quadrilateral spring-frame, the handle-socket and fork-head being utilized as two sides of the quadrilateral.

It will be seen that the fork-head H is prolonged to afford space for the upper connecting-rod A. Below this is the lower connecting-rod C, and on either side are the equivalents of the other rods B and D. Inside the frame is the tension-spring T, which, as before stated, controls the movement of the frame, and can be placed in any position suitable for that purpose. The effect of this arrangement is that on an obstacle being encountered the distance between the sides of the quadrilateral and between the centers of the wheels and the body of the machine or the seat thereof will be altered, and the tension-spring will yield somewhat till it recoils and draws the frame back to its normal position. As a consequence, the vibration caused by contact with the obstacle is taken up by the spring and does not affect the rider.

Having now particularly described and ascertained the nature of my said invention, and in what manner the same is to be performed, I declare that what I claim is—

1. In a velocipede or similar vehicle, the combination, with the frame-piece or rod D and the sprocket-wheel, of the hinged rod or brace C, the upwardly-extending hinged rod or brace B, the connecting hinged rod A, and the transverse connecting-spring E, substantially as set forth.

2. The combination, with the front portion of the main frame, and the bar F, adapted to carry the front wheel and jointed at G to said frame, of the spring S, connecting said bar and frame, substantially as set forth.

In witness whereof I have hereunto set my hand in presence of two witnesses.

HUGO AUGUSTE BECKER.

Witnesses:
W. S. BROWHEAD,
GEO. BLACK.